United States Patent [19]

Durgan

[11] 4,091,519

[45] May 30, 1978

[54] PULLING TOOL WITH ADAPTER FOR USE IN CONFINED SPACES

[75] Inventor: Virgil R. C. Durgan, Tremont, Ill.

[73] Assignee: Caterpillar Tractor Co., Peoria, Ill.

[21] Appl. No.: 802,609

[22] Filed: Jun. 2, 1977

[51] Int. Cl.[2] .................... B23P 19/02

[52] U.S. Cl. .................... 29/427; 29/252

[58] Field of Search .................... 29/427, 252; 81/53.2

[56] References Cited

U.S. PATENT DOCUMENTS 2,789,619 4/1957 Wing et al. .................... 29/252 X 3,555,649 1/1971 Rigot et al. .................... 29/252 X

*Primary Examiner*—Milton S. Mehr

*Attorney, Agent, or Firm*—Wegner, Stellman, McCord, Wiles & Wood

[57] ABSTRACT

A hydraulic puller tool for use in confined spaces including a housing defining an annular fluid-receiving chamber and having a hollow, open ended, tube-like center extending from end to end of the housing, an annular piston slidably received within the chamber and having an end extending from an end of the housing in sealed relation thereto with an opening aligned with the hollow center, at least one port in the housing for admitting fluid into the chamber, and a tube-like adapter freely received in the piston opening and the hollow center and rotatable therein, the adapter having a radially extending stop engaging the end of the piston and being at least partially internally threaded at a location remote from the stop.

8 Claims, 4 Drawing Figures

PULLING TOOL WITH ADAPTER FOR USE IN CONFINED SPACES

BACKGROUND OF THE INVENTION

This invention relates to puller tools and, more particularly, to power operated puller tools such as hydraulic puller tools.

Power operated puller tools, such as hydraulic puller tools have long been used with a great deal of success in extracting pins or the like from force-fit connections. A typical hydraulic puller tool includes a housing defining an annular chamber with a hollow, open center extending from end to end and a piston mounted within the chamber and having an end extending from the housing with an opening in the end aligned with the hollow center of the housing. In the usual case, the housing is affixedly mounted in spaced relation to the pin to be pulled and a bolt or the like is inserted into the hollow center of the housing through the opening in the piston end such that the head of the bolt abuts the latter. The bolt is threaded into a tapped bore in the pin to be pulled and hydraulic fluid under pressure is admitted into the chamber to extend the piston from the housing, thereby pulling the pin from its bore by reason of the connection of the piston to the pin through the bolt.

Such pulling tools work well for their intended purpose so long as (a) the length of the piston stroke is sufficient to completely free the pin from the bore in which it is force-fit and (b) there is sufficient room in the environment of use to allow sufficient extension of the piston to pull the pin free. When such circumstances do not prevail, however, other measures must be taken. For example, in some cases, where one operation of the puller tool is insufficient to fully free the pin, it may be necessary to disassemble the arrangement and set it up anew using a shorter bolt. In other cases, where sufficient room exists, after one operation of the tool, shims may be disposed between the bolt head and the piston and the tool again operated.

While such procedures will ultimately result in the pin being freed from the bore in which it is received, they are frequently time consuming and, when it is necessary to perform them in relatively inaccessible spaces, extremely difficult and tedious to perform in terms of properly manually locating the parts.

SUMMARY OF THE INVENTION

The present invention is directed to overcoming one or more of the above problems.

According to one aspect of the present invention, there is provided a pulling tool comprising first and second members connected together for relative movement between extended and retracted positions along with means for effecting relative movement between the members. A tube-like adapter is mounted on one of the members for relative rotation with respect to the other of the members and the adapter is at least partially internally threaded. Means are provided for precluding relative axial movement between the adapter and the member rotatably receiving the same in at least one direction and means are provided on either the adapter or the other member for receiving a rotative force to effect relative rotation between the adapter and the other member.

According to another aspect of the invention, there is provided a method of pulling a tapped pin or the like in a confined space using a fluid operated, extendable pulling tool having a hollow passage extending from end to end of the tool and both relatively movable members of the tool. The method includes the steps of inserting a rotatable sleeve having a tapped interior and a radially extending stop flange into the tool passage until the flange abuts one of the relatively movable members. A threaded stud is threaded to the tapped pin and to the tapped interior of the sleeve such that the other relatively movable member is fixed stationarily and is axially spaced from the pin. Extension of the tool is then effected. Following extension of the tool, the sleeve is rotated to advance the stud into its tapped interior and retraction of the tool is effected. The steps of effecting extension of the tool and rotating the sleeve and effecting retraction of the tool are repeated seriatim until the pin is freed.

Other objects and advantages will become apparent from the following specification taken in connection with the accompanying drawings.

DESCRIPTION OF THE PREFERRED EMBODIMENT

Figure 1:
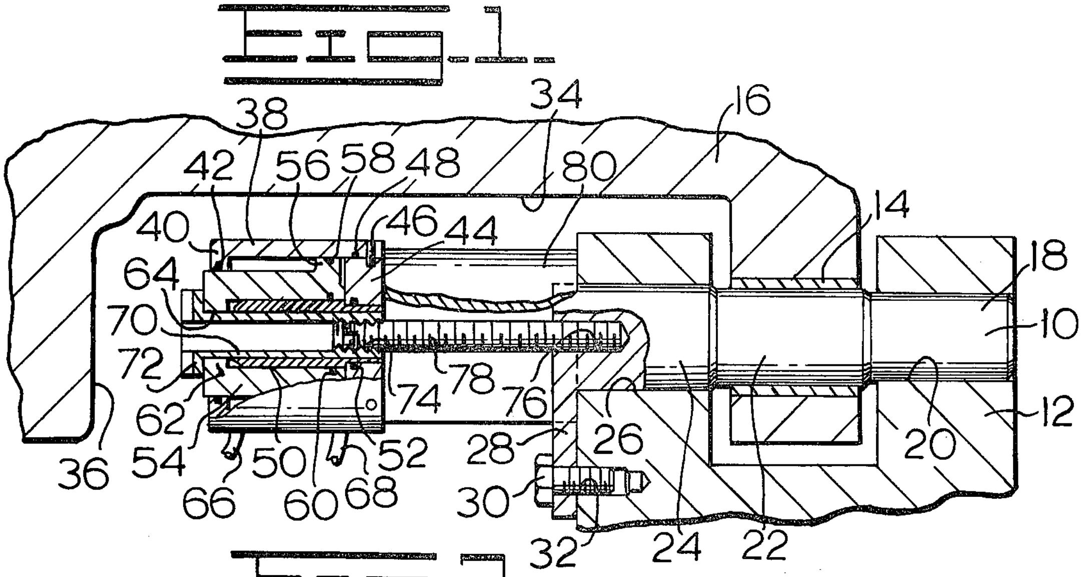
FIG. 1 is a sectional view of a pulling tool made according to the invention disposed in position to initiate a pin pulling operation.
Figure 2:
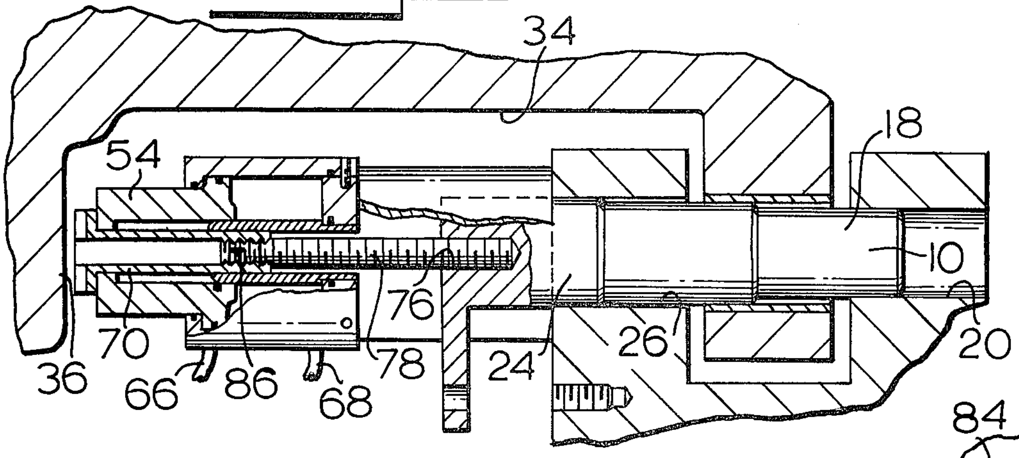
FIG. 2 illustrates a subsequent stage in the pin pulling operation with the tool fully extended and the pin only partially freed.
Figure 3:
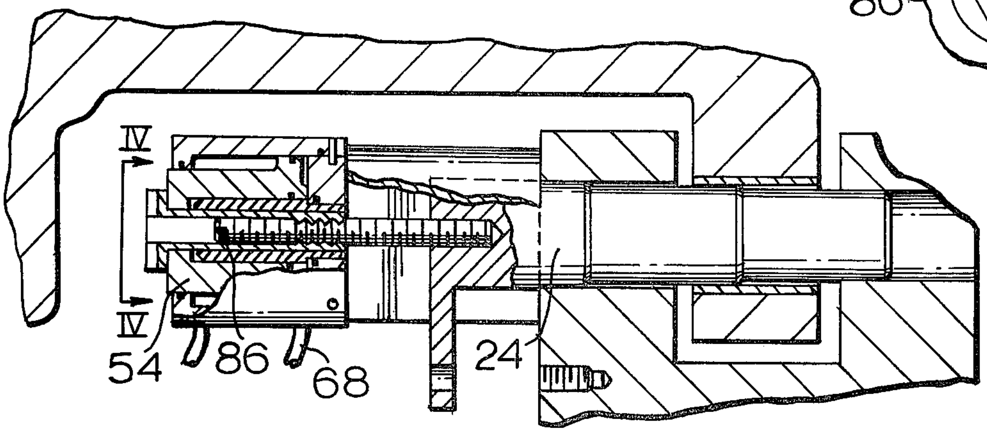
FIG. 3 illustrates a sequence in the use of the tool preparatory to pulling the pin and occurring after the configuration of components illustrated in FIG. 2 has been assumed.

An exemplary embodiment of the pulling tool made according to the invention is illustrated in the drawings and with reference to FIGS. 1, 2 and 3, is illustrated as employed in pulling a pin 10 force fit in a yoke 12 and journalling by means of a bearing sleeve 14, an assembly 16. The pin 10 has three different diameters including a minimum diameter section 18 received in a bore 20 in one leg of the yoke 12 and intermediate diameter section 22 receiving the sleeve 14 and normally disposed between the legs of the yoke 12 and a maximum diameter section 24 received in a bore 26 in the other leg of the yoke 12. The pin 10 also includes a radially extending tongue 28 through which a bolt 30 extends to be received in a tapped bore 32 in the yoke 12 to insure positive retention of the pin 10. In the usual case, the maximum and minimum diameter sections 24 and 18 respectively, will be force fit in the bores 26 and 20 respectively. At the same time it will be recognized that once the maximum diameter section 24 has cleared the bore 26, the remaining sections 20 and 22 will freely pass through the bore 26.

As alluded to previously, the puller tool of the present invention is especially adapted for use in confined spaces, although it can be used with equal efficacy where spaces limitations do not pose a problem. In order to illustrate the use of the puller tool under the most difficult circumstances, namely, in a confined area, the assembly 16 is illustrated as having a recess 34 receiving one leg of the yoke 12 and terminating in a wall 36 spaced therefrom. As can be ascertained from FIG. 1, the axial length of the maximum diameter section 24 is such that the puller tool cannot extend to the left sufficiently to completely free the maximum diameter section 24 from the bore 26 before encountering the wall 36.

With the foregoing in mind, the puller tool will now be described in greater detail. The puller tool includes a housing including a tubular, radially outer wall 38 terminating in one end with a radially inwardly directed flange 40. A peripheral seal 42 is disposed on the radially inner surface of the flange 40 for purposes to be seen.

At the opposite end of the outer wall 38, a donut-shaped end wall 44 is provided and the same is held in place by pins 46. Seals 48 seal the interface between the radially outer wall 38 and the end wall 44.

A tubular, radial inner wall 50 is secured by any suitable means to the aperture in the center of the end wall 44 and a seal 52 is located at the interface of the tube.

It will be noted that the flange 40 on the radially outer wall 38 defines an end wall for the housing opposite from the end wall 44 and is directed toward, but does not extend to the radially inner wall 50.

An annular piston 54 is disposed within the chamber defined by the end walls 40 and 44 and inner and outer walls 50 and 38. The piston 54, intermediate its ends, has an outer diameter less than the inner diameter of the radially outer wall 38. At one end, namely the end adjacent the wall 44, the piston 54 includes a radially outwardly directed flange 56 which carries a seal 58 in sealing engagement with the outer wall 38. The same end also carries a seal 60 in sealing engagement with the inner wall 50.

At the end of the piston 54 opposite from the flange 56, the same includes a radially inwardly directed flange 62 which defines an opening 64 aligned with the interior of the inner wall 50. It will be observed that the seals 42 sealingly engage on the piston 54.

The housing includes ports 66 and 68 opening to the interior of the chamber on opposite sides of the piston flange 56. As a consequence, admission of hydraulic fluid under pressure to the port 66 will cause the piston 54 to move to the right as viewed in FIG. 1 until the position illustrated therein is assumed. Conversely, the direction of hydraulic fluid under pressure to the port 68 will drive the piston 54 to the left until the position illustrated in FIG. 2 is assumed.

According to the present invention, a tube-like adaptor or sleeve 70 is inserted through the aperture 64 in the piston end 62 and through the interior of the radially inner wall 50 of the housing. The tube 70 is sized to be rotatable with respect to both the piston 54 and the housing including the radially inner wall 50.

At one end, the adaptor sleeve 70 includes a radially outward extending stop in the form of a flange 72. The flange 72 is adapted to abut against the radially inwardly directed flange 62 on the end of the piston 54 with the consequence that when the piston 54 is extended from the housing as shown in FIG. 2, the adaptor sleeve 70 will be moved to the left of the same. Thus, the flange 72 serves as a shoulder which in turn provides a means for precluding relative axial movement between the piston and the adaptor in at least one direction.

The end of the adaptor sleeve 70 remote from the flange 72 has a threaded interior 74.

In the typical case, the pin 10 will be provided with a tapped bore 76 and according to the present invention, a threaded stud 78 is threaded into both the bore 76 and into the threaded interior 74 of the adaptor sleeve 70. Consequently, when the piston 54 is urged to the left as shown in FIG. 2, the interconnection between the piston 54 and the pin 10 will cause the latter to be partially extracted from its bore 26, assuming that the housing is not permitted to move to the right. Typically, to prevent such from occurring, a brace formed of a tube or a short channel section such as the brace 80 will be interposed between the housing and the part holding the pin, here the leftmost leg of the yoke 12.

As seen in FIG. 2, the piston 54 has travelled its full stroke and yet the maximum diameter section 24 of the pin 10 as well as the minimum diameter section 18 have not been fully freed from their force fit within bores 26 and 20 respectively. At the same time, further extension of the puller tool to the left is precluded by both the fact that the piston 54 has travelled the full length of its path, and even if it had not, the wall 36 of the recess 34 would preclude a sufficient further movement to fully free the pin 10. Accordingly, in use of the tool, the adaptor sleeve 70 is rotated either immediately following or simultaneously with the retraction of the piston 54 into the housing by the release of fluid under pressure at the port 68 and the application of fluid under pressure at the port 66. Consequently, the stud 78 will more deeply enter the interior of this adaptor sleeve 70 until the position illustrated in FIG. 3 is assumed. Fluid under pressure may then be reapplied to the port 68 to extend the piston once again and with the components dimensioned as illustrated in the drawings, something short of full extension of the piston 54 will result in the complete freeing of the sections 18 and 24 from their force fits within bores 20 and 26 respectively. At that time, the stud 78 may be removed from the tapped bore 76 and the components disassemble. If the recess 34 is sufficiently small that the stud 78 cannot be so removed, the piston 54 may again be retracted and the adaptor sleeve 70 rotated to reduce the axial distance from the flange 72 of the adaptor sleeve 70 and the end of the pin 10 receiving the stud sufficiently to allow the stud to be unthreaded from the bore 76.

While according to the above illustration of operation, extension of the piston 54 was only required twice to fully free the pin 10, in other cases, the steps of extending the piston followed by retraction by the piston and rotation of the sleeve may be repeated as often as necessary to free the pin.

Figure 4:
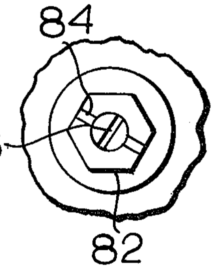
FIG. 4 is a sectional view taken approximately along the lines 4—4 of FIG. 3.

In order to facilitate rotation of the adapter sleeve 70, the radially outer surface of the flange or shoulder 72 is provided with a bolthead configuration 82 as best seen in FIG. 4 allowing the application of the wrench or the like thereto to effect relative location between the adaptor sleeve 70 and the housing. If desired, one or more slots 84 may be located in the end face of the flange 72 for receipt of a screwdriver or the like when the puller tool is not being employed in a confined space.

A slot 86 on the left-hand end of the stud 78 is accessible through the sleeve 70 and is designed to receive a screw driver or the like to effect relative rotation between the stud 78 and the sleeve 70 should the stud 78 "hang up" in the sleeve 70 due to the presence of foreign material or the like.

From the foregoing, it will be appreciated that a puller tool made according to the invention can be utilized in confined spaces as well as other locations extremely advantageously in that the components employed do not have to be disassembled when pin removal cannot be accomplished in one step.

The embodiment of the invention in which an exclusive property or privilege is claimed are defined as follows:

1. A fluid operated pulling tool comprising:

a housing having a chamber defined by a tubular radially outer wall, a tubular radially inner wall, a first end wall interconnecting said inner and outer walls at corresponding ends thereof, and a second end wall opposite of said first end wall and extending radially from one of the inner and outer walls toward, but not to, the other of the inner and outer walls;

an annular piston within said chamber and slidably and sealingly engaging said inner and outer walls and said second end wall;

port means in said housing in fluid communication with said chamber;

a tubular adapter carried by said piston for relative rotation with respect to said housing, said tubular adapter being at least partially internally threaded and axially aligned with the interior of said tubular inner wall;

means for precluding relative axial movement between said piston and said adapter in at least one direction; and a formation on one of said adapter and said housing and accessible from the exterior of said housing for receiving a rotative force for effecting relative rotation between said adapter and said housing.

2. The fluid operated pulling tool of claim 1 wherein said precluding means comprises a radially outwardly extending shoulder on said adapter and engageable with a radially extending surface on said piston.

3. The fluid operated pulling tool of claim 2 wherein said shoulder is on an end of said adapter and said formation comprises a bolt head configuration on the radially outer surface of said shoulder.

4. The fluid operated pulling tool of claim 3 wherein said shoulder is on an end of said adapter and said formation comprise a slot in said end of said adapter.

5. A pulling tool comprising:

first and second members connected together for relative movement between extended and retracted positions;

means for effecting relative movement between said members;

a tube-like adapter mounted on one of said members for relative rotation with respect to the other of said members, said adapter being at least partially internally threaded;

means for precluding relative axial movement between said adapter and said one member in at least one direction; and means on one of said adapter and said other member for receiving a rotative force to effect relative rotation between said adapter and said other member.

6. A hydraulic puller tool comprising:

a housing defining an annular fluid receiving chamber and having a hollow, open ended tube-like center extending from end to end of said housing;

an annular piston slidably received within said chamber and having an end extending from an end of said housing in sealed relation thereto with an opening aligned with said hollow center;

at least one port in said housing for admitting fluid into said chamber; and a tube-like adapter freely received in said piston opening and said hollow center and rotatable therein, said adapter having a radially extending stop engaging said end of said piston and being at least partially internally threaded at a location remote from said stop.

7. The hydraulic puller tool of claim 6 wherein said radially extending stop comprises a bolt head configuration.

8. A method of pulling a tapped pin or the like in a confined space using a fluid operated extendable pulling tool having a hollow passage extending from end to end of the tool and in both relatively movable members of the tool comprising the steps of:

a. inserting a rotatable sleeve having a tapped interior and a radially extending stop flange into the tool passage until the flange abuts one of the relatively movable members;

b. threading a threaded stud into the tapped pin and the tapped interior such that the other relatively movable member is fixed stationarily axially spaced from the pin;

c. effecting extension of said tool;

d. rotating said sleeve to advance said stud into said tapped interior and effecting retraction of said tool; and e. repeating steps (c) and (d) seriatim until the pin is freed.

* * * * *